United States Patent [19]
Haapala

[11] 3,727,508
[45] Apr. 17, 1973

[54] CUTTING GUAGE FOR CAKES

[76] Inventor: Ray Haapala, Route 3, Box 76, Dassel, Minn. 55325

[22] Filed: Dec. 10, 1971

[21] Appl. No.: 206,723

[52] U.S. Cl. ..........................83/859, 83/4, 83/527, 83/574, 269/291
[51] Int. Cl. ..............................................A47j 43/00
[58] Field of Search .....................146/150 R, 150 A; 144/129; 83/527, 574, 4, 859; 269/291; 145/129

[56] References Cited

UNITED STATES PATENTS

| | | |
|---|---|---|
| 1,305,378 | 6/1919 | Laurents................................145/4.2 |
| 1,589,030 | 6/1926 | Whiting.............................146/150 R |
| 2,314,697 | 3/1943 | Goff......................................144/2 D |
| 3,347,296 | 10/1967 | Rothman.......................146/150 R X |

*Primary Examiner*—Willie G. Abercrombie
*Attorney*—James H. Littlepage

[57] ABSTRACT

A knock-down rectangular frame has two opposite sides with straight edges which serve as knife guides. Adjustable distance pieces at the ends of the frame sides predetermine the heights of the straight edges.

4 Claims, 5 Drawing Figures

PATENTED APR 17 1973　　3,727,508
FIG.1
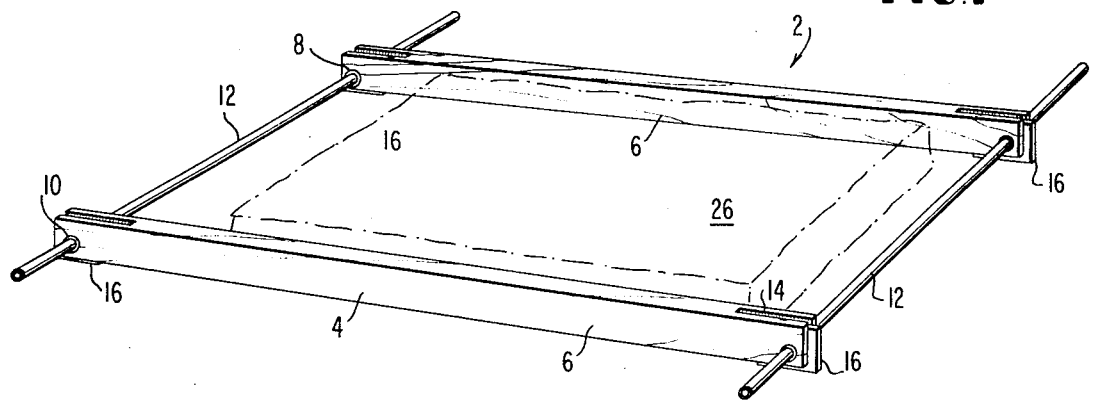
FIG.2
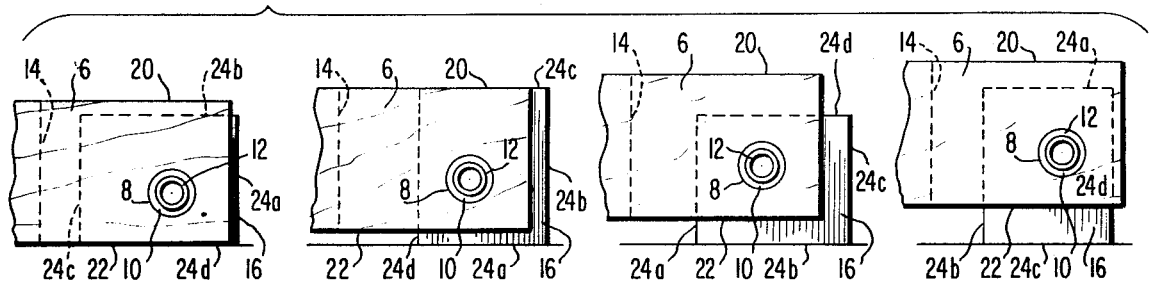
FIG.3
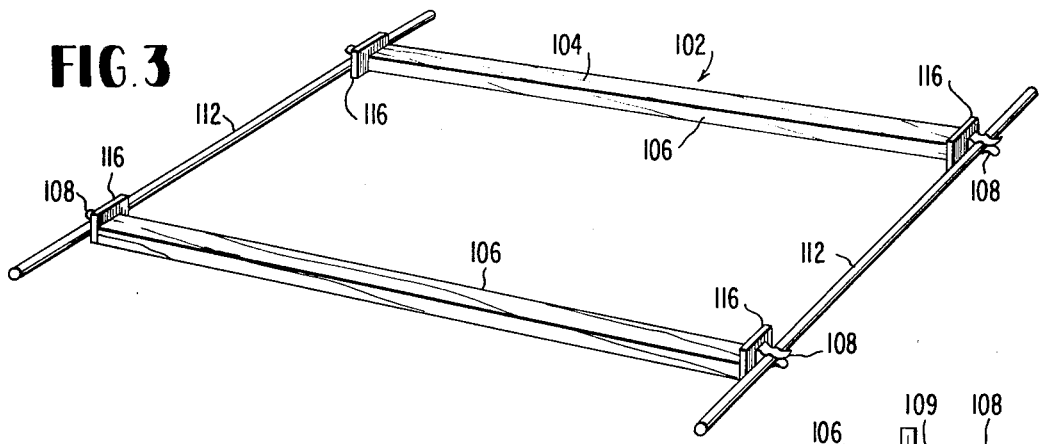
FIG.4
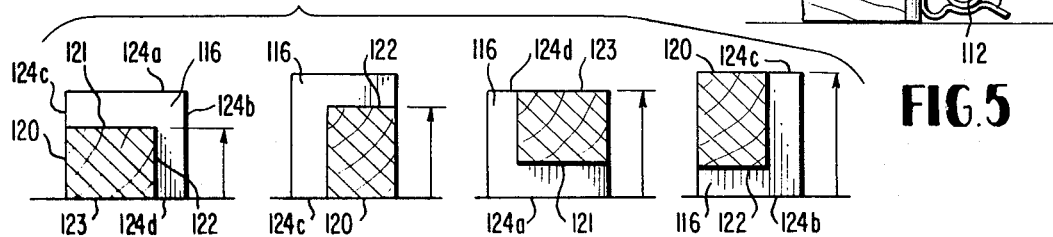
FIG.5

3,727,508

CUTTING GUAGE FOR CAKES

FIELD OF INVENTION

Bread, Pastry And Confection Making, Implements.

PRIOR ART

Bollman Ser. No. 285,874 and Goff U.S. Pat. No. 2,314,697.

OBJECTS

In the baking of cakes having many layers stacked one upon another, one of the problems is that the tops of the layers are not even. The thickness of a cake layer varies from part-to-part so that when several of them are stacked up, the cake leans, giving a "Tower of Pisa" effect. The object of this invention is to provide a knock-down frame which can be placed around a cake layer to serve as a gauge so that uneven portions of the top of a cake layer may be shied off, leaving the layer uniform in thickness.

It was heretofore known to provide saw cutting guides or gauges consisting of frames which fit around a stump or a cutting block, and which have straight edges for guiding a saw so that the top of the stump or cutting block can be cut off squarely. While the broad principles of this prior art are utilized in this invention, it is intended to provide improvements which adapt this device to certain idiosyncrasies of the fancy cake maker's art.

To this end, it is intended now to provide a knock-down frame having two opposed sides which can be rested upon a table which supports a cake layer, the height of the top edges of the sides being a predetermined distance, and which frame sides have their opposite ends adjustable distance pieces so that the height of the top edges can be raised by predetermined increments so that cake layers can be trimmed to different thicknesses with the same gauge.

Two embodiments of the invention are disclosed, both of them being knock-down frames having two opposed sides formed of wooden strips, the other opposed sides being formed of metal rods. In the first embodiment, the rods slidably engage through holes through the strips near the ends thereof, and in the second embodiment the rods engage in spring metal clips swivelled to the ends of the strips. In the first embodiment, the distance pieces are rotatably supported in the strip ends, and in the second embodiment the distance pieces are affixed across the strip ends.

BRIEF DESCRIPTION OF THE DRAWING

FIG. 1 is a perspective view of the first embodiment;

FIG. 2 is a series of fragmentary views of an end of a frame side constructed according to the FIG. 1 embodiment showing a distance piece in four different positions;

FIG. 3 is a perspective view of a modified form of the gauge;

FIG. 4 is a series of views showing a distance piece and frame side constructed according to the FIG. 3 embodiment in four different positions of adjustment; and, FIG. 5 is a fragmentary view of an end of a frame side according to the FIG. 3 embodiment.

Reference is made to the drawing in which like reference numerals denote similar elements, and wherein the elements of the second embodiment which correspond to the elements previously described in connection with with the first embodiment are preceded by a hundreds prefix.

In the FIG. 1 embodiment, the cutting gauge 2 consists of a rectangular frame 4, two opposed sides of which are formed by wooden strips 6 which are rectangular in cross section and which have holes 8 therethrough near the ends. Grommets 10 in holes 8 slideably receive metal rods 12 which form the two other sides of the rectangular frame. Slots 14 in the strip ends accommodate distance pieces 16 which are rectangular members having eccentric apertures 18 through which grommets 10 engage. It is note-worthy that holes 8 through the end of the wooden strips are spaced sufficiently far from the top edges of the strips 20 and close enough to the bottom edges 22 of the strips so that normally the distance pieces do not project above the top edges 20 whereas, depending upon how the distance pieces are rotated, one of the edge portions 24a, 24b or 24c will project below the bottom edge 22 of a strip. Edge protion 24d does not ever project below the bottom edge of the strip.

In operation, metal rods 12 are engaged through grommets 10 and the two wooden strip sides 6 of the rectangular frame 4 are adjusted towards or away from one another so that they may be set down close to opposite sides of a cake layer 26. Depending upon the thickness to which the cake layer is to be trimmed, distance pieces 16 are rotated to one position or the other. If the height of the cake layer is to be exactly the height of the frame between the top and bottom edges 20 and 22 of strip 6, the distance pieces are rotated so that their edges 24d, which do not project, are lower most. If the maximum height of the cake layer is to be more than the height of the wooden strips between the top and bottom edges thereof, the distance pieces 16 are similarly adjusted so as to bring the selected edge portion 24a, 24b or 24c lowermost, and since these latter edge portions, when lowermost, extend downwardly for different distances, the heights of the top edges 20 of strip 6 will correspondingly be raised above the surface of the table upon which the frame and the cake layer are supported. The top edges 20 of strips 6 serve as a cutting gauge for a suitable cake knife.

The cutting gauge 102 shown in FIG. 3 is generally like the one previously described, in that it consists of a rectangular frame 104, two opposed sides of which are formed by wooden strips 106. At each end of the strips are spring clips 108 which are swivelled as indicated at 109, so that strips 106 may be rotated. The jaws 110 of clips 108 receive metal rods 112 which form the other two sides of the rectangular frame. In this embodiment, the distance pieces 116 are rectangular members eccentrically affixed across the ends of the wooden strips 106. The thickness of the strips between top and bottom edges 120 and 122 is greater than the thickness between side edges 121 and 123; and distance pieces 116 are eccentrically affixed on the strip ends so that edge portions 124a and 124b project beyond strip edges 121 and 122, respectively, but the edge portions 124c and 124d are flush with the strip edges 120 and 123. It will thus be apparent by swivelling the strips 106 to any one of four positions, the edge thereof which is then uppermost will correspondingly be spaced at one of four different heights above the table upon which the gauge is supported.

I claim:

1. A cake cutting gauge comprising a knock-down rectangular frame having one pair of opposed sides formed of wooden strips rectangular in cross section and having straight longitudinal edges, and the other pair of opposed sides formed of metal rods, means for slidably connecting said rods to the ends of the strips so that the latter may be adjusted towards and away from one another and adjustable distance pieces connected to the ends of said strips so that the extreme height of the upper edges of the strips above a supporting table can be adjusted.

2. A cake cutting gauge as claimed in claim 1, the means for slidably connecting the ends of the rods to the ends of the strips comprising grommets engaged through holes in the strip ends, said distance pieces comprising rectangular spacer members disposed in slots in the strip ends and eccentrically and rotatably mounted on said grommets, at least some edge portions of each distance pieces projecting beyond a longitudinal edge of a strip for a predetermined distance, depending upon the rotational position of the distance piece.

3. A cake cutting gauge as claimed in claim 1, the means for slidably connecting said rods to the ends of the strips comprising spring clips swivelled to the strip ends and having jaws for engaging over the rods, said strips being swivellable between four positions to one of their four sides uppermost, said distance pieces comprising rectangular spacer members affixed across the ends of the strips and having at least two edge portions projecting beyond sides of the strips and providing different extreme heights for the strip edges, depending upon which one is uppermost.

4. A cake cutting gauge as claimed in claim 3, the distance between one opposed pair of longitudinal edges of the strips being greater than the distance between the other opposed pair of longitudinal edges, and the distance pieces projecting beyond adjacent longitudinal edges of the strips.

* * * * *